(No Model.)
O. H. CASTLE.
STEAM ENGINE.
No. 424,093. Patented Mar. 25, 1890.
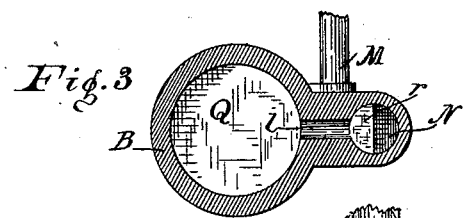
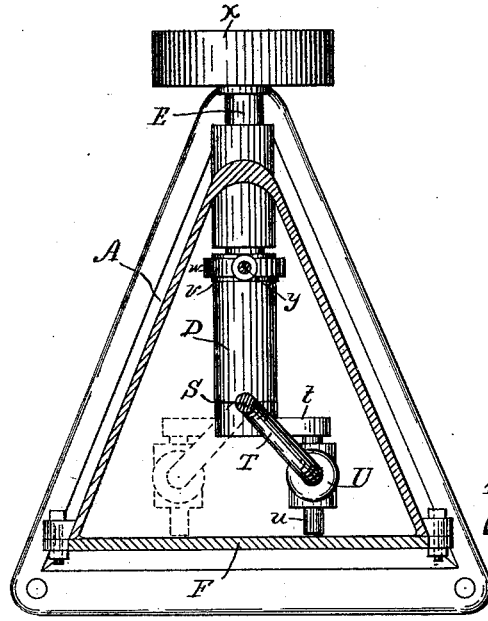
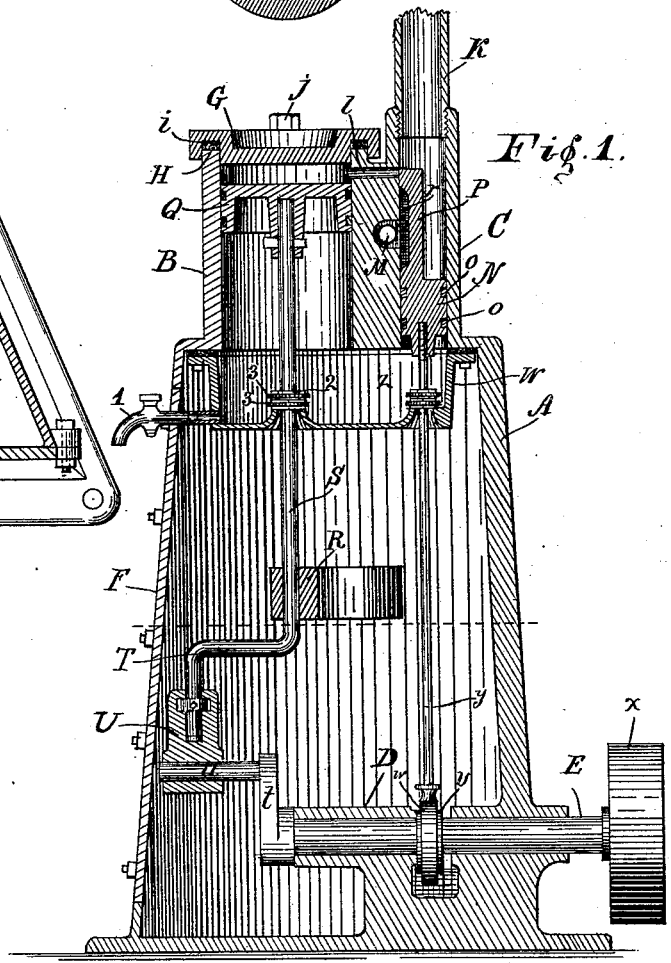
Witnesses
H. P. Hood
V. M. Hood
Inventor
Oliver H Castle

UNITED STATES PATENT OFFICE.

OLIVER H. CASTLE, OF INDIANAPOLIS, INDIANA.

STEAM-ENGINE.

SPECIFICATION forming part of Letters Patent No. 424,093, dated March 25, 1890.

Application filed June 22, 1889. Serial No. 315,181. (No model.)

*To all whom it may concern:*

Be it known that I, OLIVER H. CASTLE, a citizen of the United States, residing at Indianapolis, in the county of Marion and State of Indiana, have invented a new and useful Improvement in Steam-Engines, of which the following is a specification.

My invention relates to an improvement in stationary, single-acting, and reciprocating steam-engines.

The object of my improvement is to provide a stationary engine of moderate power, which will be compact, of few parts, and easily constructed, as hereinafter fully described.

The accompanying drawings illustrate my invention.

Figure 1 represents a central vertical section. Fig. 2 represents a plan at $a$, Fig. 1, showing the position of the cranks at half-stroke. Fig. 3 represents a section at $b$, Fig. 1.

A is a hollow casing, preferably triangular in section, and forming a support for the cylinder B, steam-chest C, and an inclosed bearing D for the main shaft E. The cylinder, steam-chest, and casing A are all cast in one piece, one side of the casing being open, which opening is closed by a removable plate F. The bearing D is formed in the apex of the triangle formed by the sides of the casing. The cylinder and steam-chest when cast are open at both ends. The upper end of the cylinder is closed by the cylinder-head G. For the purpose of making a tight joint between the cylinder and its head with as little labor as possible, I form, in casting the head on its inner face, a deep annular groove H, adapted to receive a thick annular gasket $i$, of rubber or other elastic packing material, and the undressed annular end of the cylinder B. The head is secured to the cylinder by bolts $j$, passing through suitable lugs (not shown) on the head and the cylinder.

K is the steam-supply pipe which enters and fills the upper end of the cylindrical interior of the steam-chest C. The interiors of the steam-chest and the cylinder are connected by a single port $l$.

M is the exhaust-port.

The slide-valve consists of a cylindrical piston N, adapted to fit and slide nicely in the cylindrical steam-chest, and provided with packing-rings $o\ o$, and having a semi-cylindrical extension P, adapted to cover the exhaust and inlet ports $l$ and M, and provided with a recess $r$, adapted to connect the inlet and exhaust ports.

Q is the piston having the usual packing-rings.

The main shaft E is provided with a crank $t$, having a long wrist-pin $u$, an eccentric $v$, and a balance-wheel $x$. It will be observed that the length of the main shaft and the arrangement of its bearings are such that the crank end of the shaft is nearly in line with the axis of the cylinder, and that the piston-rod would, if continued in a straight line, intersect the shaft. By this construction, which is rendered possible by the bending of the piston-rod, as hereinafter explained, it is possible to furnish, within the limits of the hollow casing or base, a long bearing for the main shaft, and to dispense with a cross-head on the piston-rod.

R is a guide for the piston-rod S. The piston-rod is bent below guide R to form a crank T of the same or greater radius as crank $t$, and having its outer end portion parallel with the main portion of the rod. Crank T is connected with crank $t$ by a swivel crank-box U. Crank-box U is provided with a longitudinal bearing 4, which receives the end of the piston-rod crank, and a transverse bearing 5 at right angles thereto and in line therewith, which receives the main-shaft crank.

The arrangement of the main shaft, the cylinder, and guide R is such that their centers are in line vertically. The slide-valve and eccentric $v$ are connected by the yoke $w$ and rod $y$. It is designed, for the purpose of lubricating, to fill the lower part of the base up to the center of the main shaft with oil, and it is desirable to prevent any drippings of water from the cylinder or steam-chest entering the space where the oil is. For this purpose I attach to the under side of the top of the casing A a drip-plate W. The edges of said plate are raised, so as to form, with a suitable gasket, a water-tight joint with the casing-top, and leaving between the top and the plate a space $z$, in which the drippings from the cylinder and steam-chest may collect, and from which they are drawn off through a petcock 1. Openings are formed in plate W for the piston-rod and the valve-rod, and the rods are surrounded with metallic packing 2, which consists, preferably, of two or more rings of soft metal, divided radially into three parts and held together by surrounding elastic bands 3 3.

The operation of the engine is as follows: Steam being admitted to the steam-chest, the valve is held closely to its seat by the pressure of the steam on the flat part of its semi-cylindrical portion. Port $l$ being opened, steam is admitted above the piston, which, moving downward, drives the main shaft a half-revolution. The crank T of the piston-rod stands nearly parallel with the crank $t$ of the main shaft at the commencement of the stroke of the piston; but as the shaft turns crank T is turned to one side, as shown in Fig. 2, and the swivel crank-box at the same time slides inward along the wrist-pin $u$, and again outward as the revolution of the main shaft is completed. The piston-rod and piston are thus given an oscillating half-revolution at each revolution of the main shaft, the return of the piston to the top of the cylinder being effected by the momentum of wheel $x$.

I claim as my invention—

1. In a steam-engine, the combination of a cranked main shaft, a cylinder, a piston-rod having a crank formed upon or rigidly secured to one end and a piston at the other, and a connecting member between the main-shaft crank and the piston-rod crank.

2. In a steam-engine, the combination of a cranked main shaft, a cylinder, a piston-rod having a piston at one end and a crank formed upon the other end, a fixed guide for the piston-rod, said guide being arranged between the piston and the piston-rod crank, and a connecting member between the main-shaft crank and the piston-rod crank.

3. In a steam-engine, the combination, with the cranked main shaft, the cylinder, and the piston, of a piston-rod having its outer end bent to form a crank, one member of which is parallel with the rod.

4. In a steam-engine, the combination of the cylinder, the piston, the piston-rod having a crank at its free end, one member of said crank being parallel with the rod, a swivel crank-box having a bearing adapted to receive the free end of the crank on the piston-rod, and having also a bearing at right angles thereto and in line therewith and adapted to receive the crank-pin of the main shaft, as set forth.

5. In a steam-engine, the combination of the cylinder, the main shaft arranged to extend to or past the axis of the cylinder, the crank on the main shaft, the piston, the piston-rod having a crank on its free end, one member of which is parallel with the rod, and the crank-box having two bearings, one of which is adapted to receive the crank of the main shaft and to turn and slide longitudinally thereon, and the other of which is adapted to receive and turn upon the piston-crank, all substantially as specified.

6. In a steam-engine, the combination, with the hollow casing, the steam-cylinder having an open end, and the steam-chest having an open end, of the drip-plate $w$, arranged to form an inclosed space beneath the open ends of the steam-cylinder and steam-chest, substantially as and for the purpose specified.

OLIVER H. CASTLE.

Witnesses:
H. P. HOOD,
V. M. HOOD.